(12) United States Patent
Ferlitsch (10) Patent No.: US 8,138,627 B2
(45) Date of Patent: Mar. 20, 2012

(54) POWER MANAGEMENT OF NETWORK-CONNECTED DEVICES IN PEAK POWER PERIODS

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 147 days.

(21) Appl. No.: 12/414,564

(22) Filed: Mar. 30, 2009

(65) Prior Publication Data

US 2009/0322151 A1 Dec. 31, 2009

Related U.S. Application Data

(63) Continuation-in-part of application No. 12/163,729, filed on Jun. 27, 2008.

(51) Int. Cl.
*H02J 3/14* (2006.01)
(52) U.S. Cl. .......... 307/39; 713/310; 713/320; 713/323; 713/340; 358/1.13; 358/1.14; 358/1.15; 358/434; 358/468; 700/291; 700/295
(58) Field of Classification Search .................. None
See application file for complete search history.

(56) References Cited

U.S. PATENT DOCUMENTS

| | | | | |
|---|---|---|---|---|
| 4,443,659 A | * | 4/1984 | Tatem | 174/140 C |
| 4,476,398 A | * | 10/1984 | Hallam | 307/39 |
| 4,888,495 A | * | 12/1989 | Feron et al. | 307/39 |
| 6,816,273 B1 | * | 11/2004 | Kuga et al. | 358/1.15 |
| 7,382,474 B2 | | 6/2008 | Motosugi et al. | |
| 2003/0036820 A1 | * | 2/2003 | Yellepeddy et al. | 700/291 |
| 2003/0172086 A1 | * | 9/2003 | Parry | 707/104.1 |
| 2004/0105688 A1 | * | 6/2004 | Komori | 399/8 |
| 2005/0182977 A1 | | 8/2005 | Powers et al. | |

(Continued)

FOREIGN PATENT DOCUMENTS

JP 2006120003 5/2006

(Continued)

OTHER PUBLICATIONS

Keane et al., "Voluntary residential time-of-use rates: lessons learned from Pacific Gas and Electric's experiment", IEEE Transactions on Power Systems, vol. 3, Issue 4, Nov. 1988.

*Primary Examiner* — Jared Fureman
*Assistant Examiner* — Justen Fauth
(74) *Attorney, Agent, or Firm* — Law Office of Gerald Maliszewski; Gerald Maliszewski (57) ABSTRACT

A system and method are provided for managing network-connected devices in peak power periods. The method establishes a network of connected devices, identifying a first device in the network as an off-peak device, and a second device as a peak device. If a peak power warning signal is detected, the off-peak device is disabled, but not the peak device. Any job destined for the off-peak device from a source device is relayed to the peak device and processed by the peak device. If the job destined for the off-peak device is a job format associated with the off-peak device, relaying the job to the peak device may further include the operation of converting the job to a job format associated with the peak device. In one aspect, a destination change message is sent to the source device, indicating the location of the peak device processing the job.

6 Claims, 6 Drawing Sheets

U.S. PATENT DOCUMENTS

| | | | |
|---|---|---|---|
| 2006/0027669 A1* | 2/2006 | Proffitt et al. | 236/1 C |
| 2006/0139679 A1* | 6/2006 | Barry et al. | 358/1.13 |
| 2006/0276938 A1* | 12/2006 | Miller | 700/295 |
| 2007/0180277 A1 | 8/2007 | Jayaram et al. | |
| 2007/0220291 A1 | 9/2007 | Stufflebeam | |
| 2009/0249091 A1* | 10/2009 | Goodnow et al. | 713/310 |

FOREIGN PATENT DOCUMENTS

| | | |
|---|---|---|
| JP | 2006251860 | 9/2006 |
| JP | 2008142942 | 6/2008 |

* cited by examiner

Fig. 1 *(CONCURRENT ART)*

POWER MANAGEMENT OF NETWORK-CONNECTED DEVICES IN PEAK POWER PERIODS

RELATED APPLICATIONS

This application is a Continuation-in-Part of a pending application entitled, SYSTEMS AND METHODS FOR CONTROLLING POWER USAGE ON A DEVICE, invented by Roy Chrisop et al., Ser. No. 12/163,729, filed Jun. 27, 2008, which is incorporated herein by reference.

BACKGROUND OF THE INVENTION

1. Field of the Invention

This invention generally relates to network management and, more particularly, to a network of connected devices managed using power consumption oriented policies.

2. Description of the Related Art

With the convergence of expensive power, greater consumer demand, and government regulations, it would be desirable to have greater management capability over groups of high-energy consuming devices, such as multifunctional peripherals (MFPs), during a period of either involuntary or administratively imposed constraint on the use of power from the power grid. These periods of constraint may be mandated by state and local regulators and implemented through signals on the power grid. Additionally, it is conceivable that businesses may be required to install readers of these signals and respond accordingly to be in regulatory compliance.

Such a period of power constraint may also occur as a result of administrative policy within an organization. In that case, signals to devices and management applications may be initiated internally through a power management application.

There have been a number of studies conducted by universities and organizations, and voluntary trial runs through state regulatory bodies, particularly in California, focusing on power management. The trial runs and studies have generally focused on one of the two following approaches: Automatic power down of device when peak-power signal is received; and, dynamic transmission of varying rate charges based on power load, with voluntary reduction.

In the automatic power down approach, a business/residential user installs a peak-power sensor in the power supply of the device and demand-side management is imposed over a facility by remote control. The use of a power reader may be centralized and associated with all devices connected to an internal grid. Alternately, the reader may connected to the device on a per device basis.

A technology called GoodWatts™ makes such a product, which was installed by the energy utility in Ashland Oreg. The technology was installed to address the issue of the Ashland utility having to pay steeper wholesale rates from the Bonneville Power Authority (BPA) when demand is high. 100 residential test customers participated in the program and were given a $100 rebate in exchange for permitting Ashland to install the GoodWatts™ monitoring equipment in their homes, and for letting the BPA operate the equipment over the Internet.

Voluntary residential time-of-use rates experiments have also been conducted by Pacific Gas and Electric (PG&E), Kean et al., "Voluntary residential time-of-use rates: lessons learned from Pacific Gas and Electric Company's experiment", IEEE Transactions on Power Systems, Vol. 3, Issue 4, November 1988, pp. 1764-1768. This residential TOU (time-of-use) experiment was one of the first in the country to examine a voluntary TOU tariff program. Analysis of the experimental data shows that in addition to providing some customers with the opportunity to achieve a windfall bill reduction, TOU rates can achieve significant load shifting. The study concluded that such programs bode well for other utilities that are contemplating offering TOU as a rate option to the residential sector, since the greater the degree of load shifting, the lower will be the rates of the customers who remain on the standard tariff. It was further concluded that PG&E's empirical findings from extensive surveys of both volunteers and non-volunteers provide valuable guidance for the marketing and customer education efforts to other utilities that wish to offer a TOU rate option to their residential customers.

Figure 1:
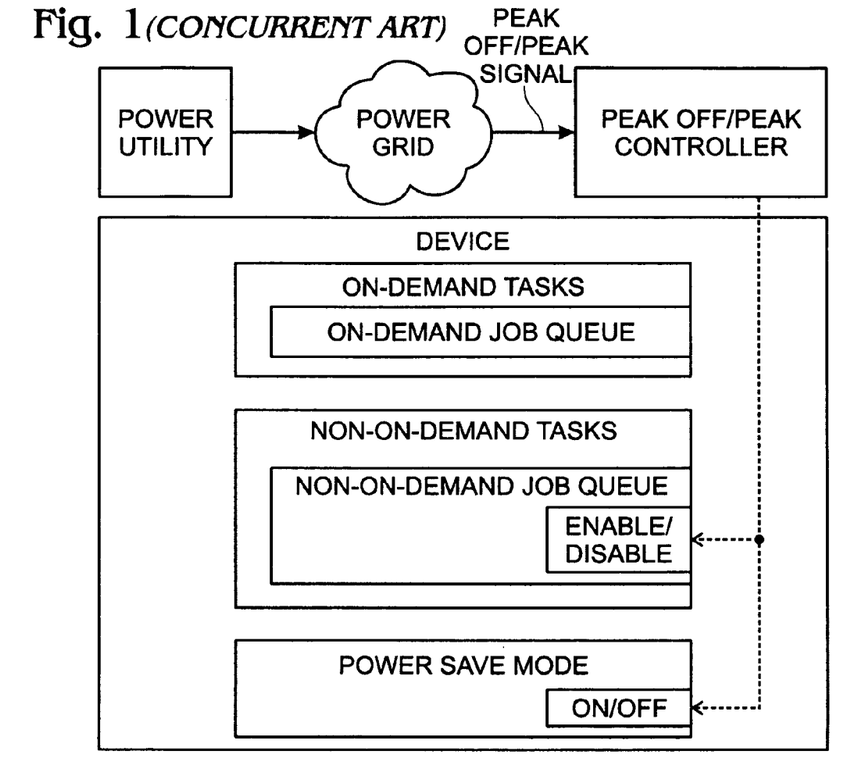
FIG. 1 is a schematic block diagram depicting a single device job classification power management system (concurrent art,).

FIG. 1 is a schematic block diagram depicting a single device job classification power management system (concurrent art). Another solution to power management has been presented in parent application SYSTEMS AND METHODS FOR CONTROLLING POWER USAGE ON A DEVICE, Chrisop et al. In the context of MFPs, a predetermined criteria, or voluntary actions, classify print jobs into one of two categories: regular (on-demand)—low consumption of energy; and, peak (non-on-demand)—high consumption of energy. During off-peak periods, both classes of jobs are processed. During peak periods, only the 'regular' class of jobs is processed and the 'peak' class is deferred until the next off-peak period. This method effectively controls the management of devices on an individual basis.

It would be advantageous if a peak power management tool existed for more effectively controlling high power consumption in a group of devices networked in a larges enterprise or organization.

SUMMARY OF THE INVENTION

Presented herein are a system and method to address the management of a group of related devices during a regulatory or administrative power reduction period. Unlike management systems that deal with the issue on a device-by-device basis, the method described herein addresses the issue on a group basis. For example, one device in a group of related devices (e.g., printers) is designated as the peak power device. All remaining devices in the group are designated as off-peak power devices. During peak power periods, the off-peak power designated devices go into a low power mode. This mode limits the functioning of the device to the front panel display and the network interface card (NIC). Powering up to process a job is prohibited.

Any existing or new jobs on the off-peak power designated devices are rerouted, via the NIC card, to an off-peak-to-peak transfer queue. This transfer queue then transfers these jobs to the peak power designated device. The transfer queue also has A->B converters to convert the format of the job from the off-peak power designated device to the peak power designated device. The front panel screens of the off-peak power designated device may be used to direct users to the location of the peak power designated device during this period. When returning back to an off-peak power period, any unprocessed jobs in the transfer queue are rerouted back to their original off-peak power designated device.

Accordingly, a method is provided for managing network-connected devices in peak power periods. The method establishes a network of connected devices; identifying a first device (or plurality of devices) in the network as an off-peak device, and a second device (or a plurality of devices) as a peak device. If a peak power warning signal is detected, the off-peak device is disabled, but not the peak device. Any job destined for the off-peak device from a source device is relayed to the peak device and processed by the peak device.

If the job destined for the off-peak device is in a job format associated with the off-peak device, relaying the job to the peak device may further include the operation of converting the job to a format associated with the peak device. In one aspect, a destination change message is sent to the source device, indicating the location of the peak device processing the job. Alternately, a front panel display of the off-peak device indicates the disabled status of the off-peak device and the identification of the peak device.

Additional details of the above-described method and a system for managing network-connected devices in peak power periods are provided below.

DETAILED DESCRIPTION

Figure 2:
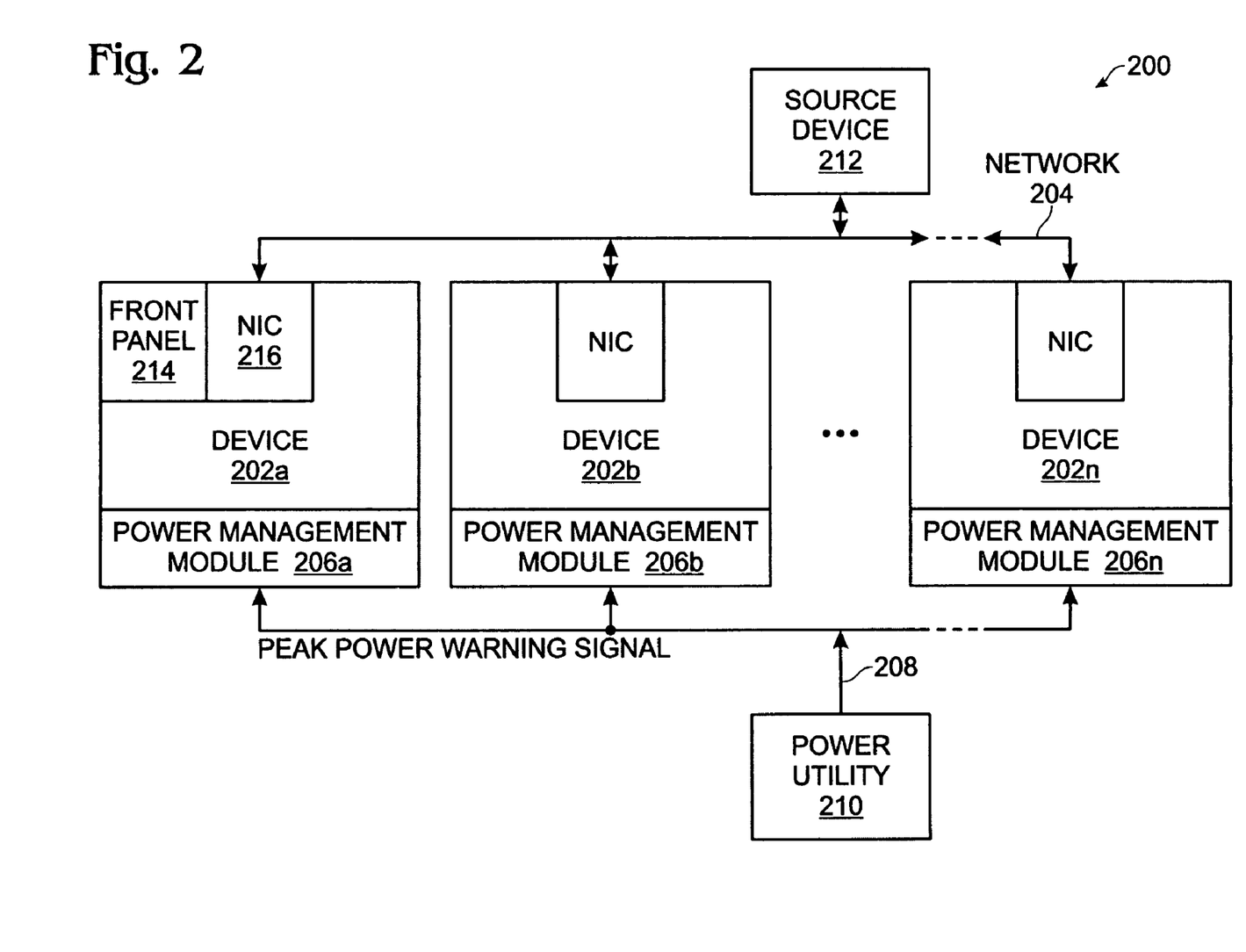
FIG. 2 is a schematic block diagram of a system for managing network-connected devices in peak power periods.

FIG. 2 is a schematic block diagram of a system for managing network-connected devices in peak power periods. The system 200 comprises a plurality of devices 202, each having a network-connected interface on line 204. Line 204 may represent a local network or intranet. However, the devices may be linked through non-local networks such as the Internet or telephonically. Shown are devices 202a through 202n, where n is a variable not limited to any particular value. In this example, device 202a is a first device identified as an off-peak device, while 202b is a second device identified as a peak device. Note: there may be a plurality of devices identified as peak devices and/or a plurality of devices identified as off-peak devices.

The determination of peak and off-peak devices may be based on efficiency. That is, the power management module 206 may compare the power consumption of the devices in the network and supply the disable signal to the device having the highest power consumption, or a plurality of devices, all having a relatively high power consumption. For example, a newer device may be able to perform the same functions as an older device while consuming less power. In the context of MFP devices, the fusing process in laser printers consumes a significant amount of power during the hardcopy outputting process. Thus, print/copy/fax-jobs, which are short, typically 1-page jobs, use nominal power when compared to long print jobs (e.g., multiple copy multi-page jobs).

Alternately, a device may be selected as a peak device because it can perform more functions than an off-peak device. In another aspect, a peak device may only be able to perform a limited range of functions, and/or perform these functions inefficiently, but the performed functions may be functions that must be performed within rigid time constraints, or these functions may just have a high value to the enterprise to which the devices belong. The criteria for selecting peak and off-peak devices may change over time. The selection criteria may change based upon business cycles or functions being formed by the enterprise at the time of the peak power warning. The selection criteria may be automatically changed using an application that takes account of the above-mentioned variables, or fixed criteria may be entered by a system administrator.

In one aspect, the plurality of network-connected devices are multifunctional peripherals (MFPs), which combine some or all of the following functions: printing, copying, scanning, faxing, filing, and emailing. Alternately, the devices may be a (single function) printer, copier, scanner, fax, electronic whiteboard, smartboard, teleconferencing equipment, air conditioners, heaters, lighting, or audio/visual equipment. The system is applicable to almost any electrical device.

A power management module 206 has an interface on line 208 to accept an electromagnetic waveform representing a peak power warning. For example, the warning may be supplied over the Internet, via a telephonic link, or embedded as a signal in the A.C. power itself from a power utility 210. In some aspects, lines 208 and 204 represent the same network. Generally, the power utility 210 has a means to determine short-term on-demand rates, for example over a 4 or 8 hour time period. A variety of factors may be used to determine these rates. For example, current power utilization and a history of past power utilization over the same time periods may be considered. Other factors may include power generation sources, their current rates, and spot market rates. Short-term power costs may be collected and used, such as the rates for purchasing power from another power generation source. Using this information, a process at the power company sets short-term peak and off-peak rates/schedules that may be guaranteed over the short-term period.

This information may then be made available electronically through a rate quote process, such as through a web service over the Internet 208. The managing application 206 can then query the power company 210 and obtain these on-demand rate/schedules. Alternately, the power company 210 may alert the managing application 206 of rate schedule changes in real-time. Using this information, the power management module 206 can set its own peak and off-peak time periods, and create internal disable signals accordingly. Generally then, the power management module 208 detects a peak power warning signal including rate information and supplies off-peak disable instructions on line 204 in response to the rate information. In this case, the power management module 206 makes a decision based on one or more of the criteria mentioned above.

In this distributed power management variation of the system, each network-connected device 202 includes a power management module 206. Shown are power management modules 206a through 206n, associated respectively with devices 202a-202n. The power management module 206a has an (internal) interface to supply an electromagnetic waveform representing a disable signal to the off-peak device 202a. The off-peak device 202a is disabled in response to the disable signal. Alternately stated, the off-peak device 202a disables itself in response to a disable signal generated by embedded power management module 206a.

Subsequent to receiving the disable signal, a job may be sent to the off-peak device 202a from a source device 212. The source device may be a personal computer or handheld wireless device for example. The off-peak device 202a relays the job to the peak device 202b, and the peak device 202b processes the job. As explained in more detail below, the peak power device may also process jobs received by the off-peak device before the disable signal, but not yet performed.

In one aspect, the off-peak device 202a sends an electromagnetic waveform to the source device 212 representing a destination change message, indicating the location of the peak device 202b processing the job. In the event that the system includes only a few devices, or if multiple devices are located in the same area, the destination change message may indicate just the "name" or ID of the peak device, or the location and ID of the peak device 202b.

In another aspect, the off-peak device 202a includes a front panel display 214 and a network interface card (NIC) 216. The other devices 202 in the system may also have front panel displays and NICs. Generally, the NIC converts the messaging protocol associated with the network on line 204 to a native format understood by the device 202a. In response to NIC 216 receiving the disable signal, the front panel display 214 indicates the disabled status of the off-peak device and the identification of the peak device. For example, the front panel display may present a message such as, "This device is disabled due to a peak power warning. Device XX, located at YY, is available for use."

Figure 3:
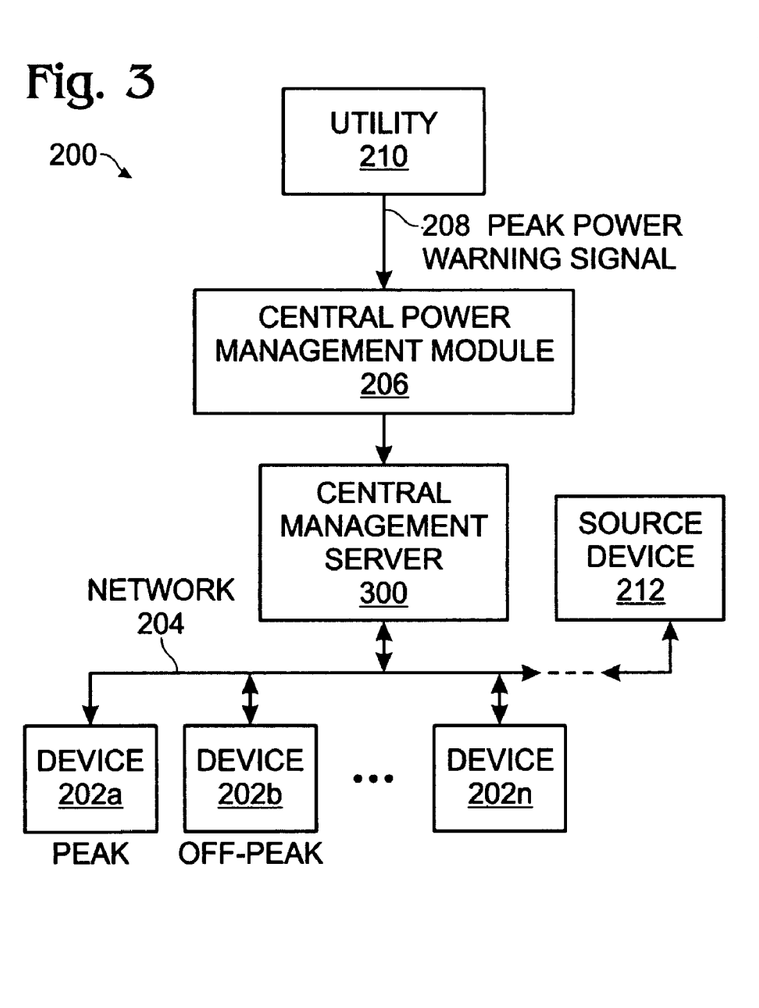
FIG. 3 is a schematic block diagram of a central power management variation of the system depicted in FIG. 2.

FIG. 3 is a schematic block diagram of a central power management variation of the system depicted in FIG. 2. The central power management 206 module receives the peak power warning on line 208, as described above. In this aspect a central management server 300 is connected to the network on line 204. The central power management module 206 supplies an electromagnetic waveform representing off-peak disable instructions to the central management server 300. Although the central power management module 206 is depicted as a stand-alone device, it may alternately be embedded with one of the devices 202 or with the central management server 300. Likewise, the central management server may be embedded with one of the devices 202.

The central management server 300 sends an electromagnetic waveform representing the disable signal to the off-peak device on line 204 in response to the off-peak disable instructions. If the central management server 300 receives an electromagnetic waveform representing a job destined for the off-peak device 202a from the source device 212, the central management server 300 relays the job to the peak device 202b, and the peak device processes the job. If the job is in a first job format associated with the off-peak device, the central management server 300 converts the job to a second job format associated with the peak device, and relays the job to the peak device. Alternately, the central management server may send the job to a network-connected conversion device (not shown), where the job formats are converted.

The elements depicted in FIGS. 2 and 3, including the power management modules and central management server, may be enabled using state machine and combinational logic. Alternately, portions of the system may be enabled using an application of microprocessor instructions that are stored in a memory and executed by a processor. Although the processor, memory, and application are not explicitly shown, the use of software instructions to monitor events and to provide instructions in response monitored events is well known in art, and it would be within the skill of an ordinary practitioner implementing specific details, once the novelties of the overall system have been taught.

Functional Description

The system described in FIGS. 2 and 3 is applicable to large enterprise, for example groups of related office devices, which can have significant power consumption needs. Such devices may include: printers, copiers, MFPs, electronic whiteboards, smartboards, teleconferencing equipment, A/V equipment, etc. The office devices are communicatively coupled through a network. Additionally, a device management application may also be coupled to the network, which can perform at least one device management function on at least one device in a device group. Such functions include: changing the power state, and shifting workloads.

Figure 4:
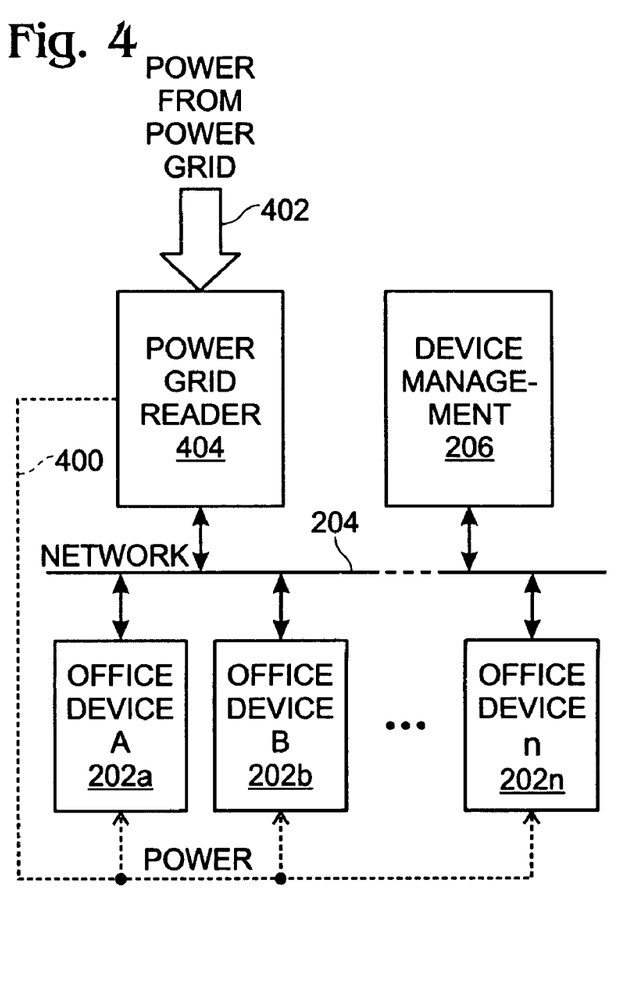
FIG. 4 is a schematic diagram depicting the systems of FIGS. 2 and 3 as viewed from another perspective.

FIG. 4 is a schematic diagram depicting the systems of FIGS. 2 and 3 as viewed from another perspective. The devices are also coupled to an internal power grid 400, which may receive its power from a utility or private external power grid. The external power grid 402 may transmit peak power usage information over the power grid, which can be read by a power grid reader 404 installed at the location where the power is being consumed. The power grid reader 404 may be connected to the same network 204 as the devices, and may communicate with the devices and/or device management application 206. In one aspect, the power grid reader is embedded with the power management module.

Figure 5:
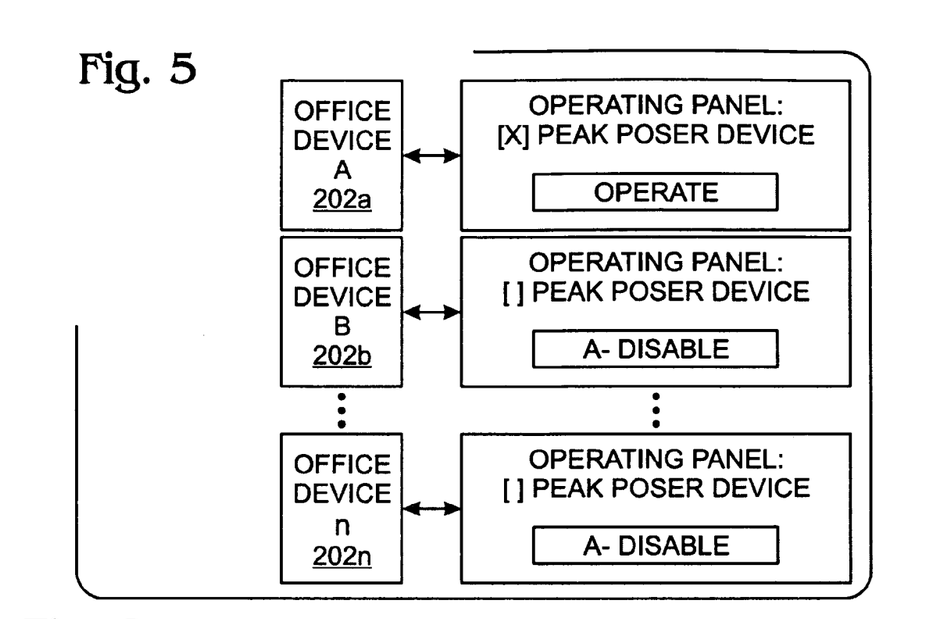
FIG. 5 is a diagram depicting the assignment of peak power identifiers to devices in a device group.

FIG. 5 is a diagram depicting the assignment of peak power identifiers to devices in a device group. A subset (one or more) of devices within a device group is designated as the group's peak power device. This assignment may be done by any means. Generally, the assignment is done through an administrative interface to each device, such as through a front operations panel, remote operating panel (e.g., embedded web page), or a programmatic interface (e.g., network protocol). Each device in the group is set to either a peak power device ("operate"), or an off-peak power device ("disable"). For each off-peak or non-peak device, a setting is made to indicate to the off-peak device, which devices are the peak devices. As shown, the off-peak devices 202b and 202n are programmed to indicate that the peak device is device "A" (device 202a). Peak device "A" may also be the default destination for relay jobs that are not performed by the off-peak device. Alternately, the off-peak devices may discover the peak devices either through a broadcast message or by receiving notifications from the peak devices. The discovery process may occur at a predefined time or time intervals, or in real-time when a peak power signal is received.

Figure 6:
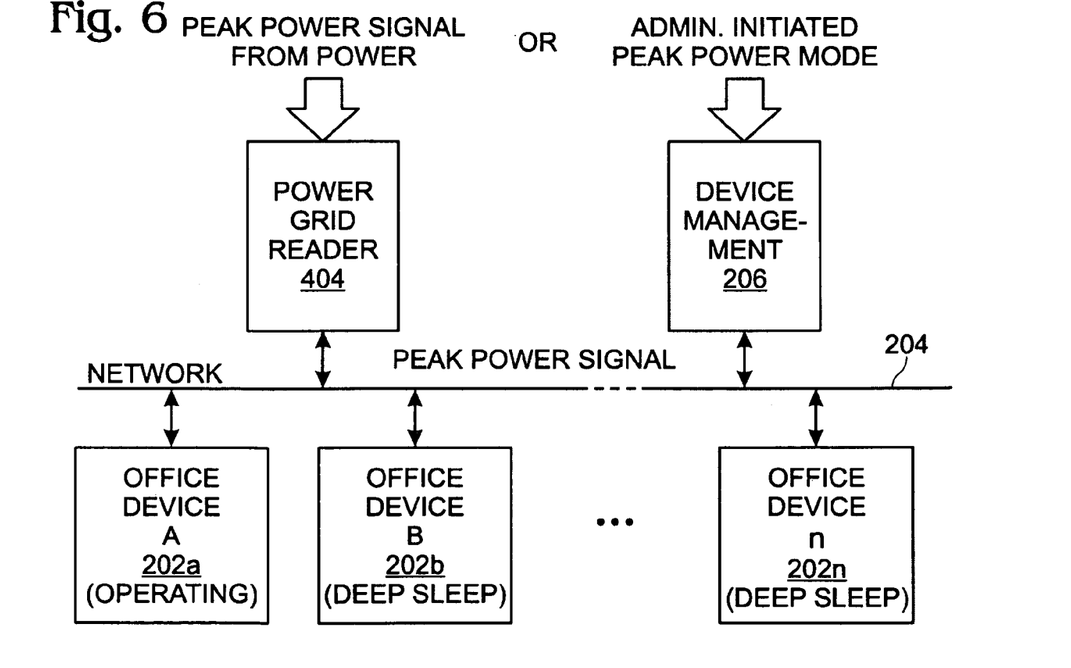
FIG. 6 depicts the system of FIG. 4, after the system enters into a peak power mode.

FIG. 6 depicts the system of FIG. 4, after the system enters into a peak power mode. This mode may be initiated by either receiving a peak power warning signal from the external power grid, or through an administrative action (e.g., operator or programmatic) performed by a device management application 206. When each device 202 in a device group receives the peak power mode command, the device performs as follows. For a peak power device (e.g., 202a) there is no change in the function of the device. The device continues to operate in full operational mode. Off-peak power devices (e.g., 202b and 202n) enter a deep sleep (disabled) mode. In this mode, all but a select number of electro-mechanical and computing functions are powered down. Powering up of these components during this period is restricted. In one aspect, the liquid crystal display (LCD) operations screen and screen controller and network card functions continue to remain powered up, but may operate in a dimmer mode which consumes less power than when operating in a non-peak power mode.

The off-peak devices remain in deep sleep mode until either a non-peak power (disabled is canceled) signal is received at the NIC card, or an administrative command is received to power up from the device management application 206. While in this deep sleep mode, the off-peak device have access to the data stored relating to the location of the peak power device. Information relating to the location and identification of the peak power device is displayed on the LCD front panel. The network card is further configured to reroute any job related request received at the NIC to the communication address of the peak power device.

In some cases, the peak power device may not be operational. In this case, the system may select an alternate peak power device from a predetermined list. The alternate peak power device may be picked using arbitrary criteria, such as the first device operationally available. In another aspect, all devices as maintained as peak power devices.

Figure 7:
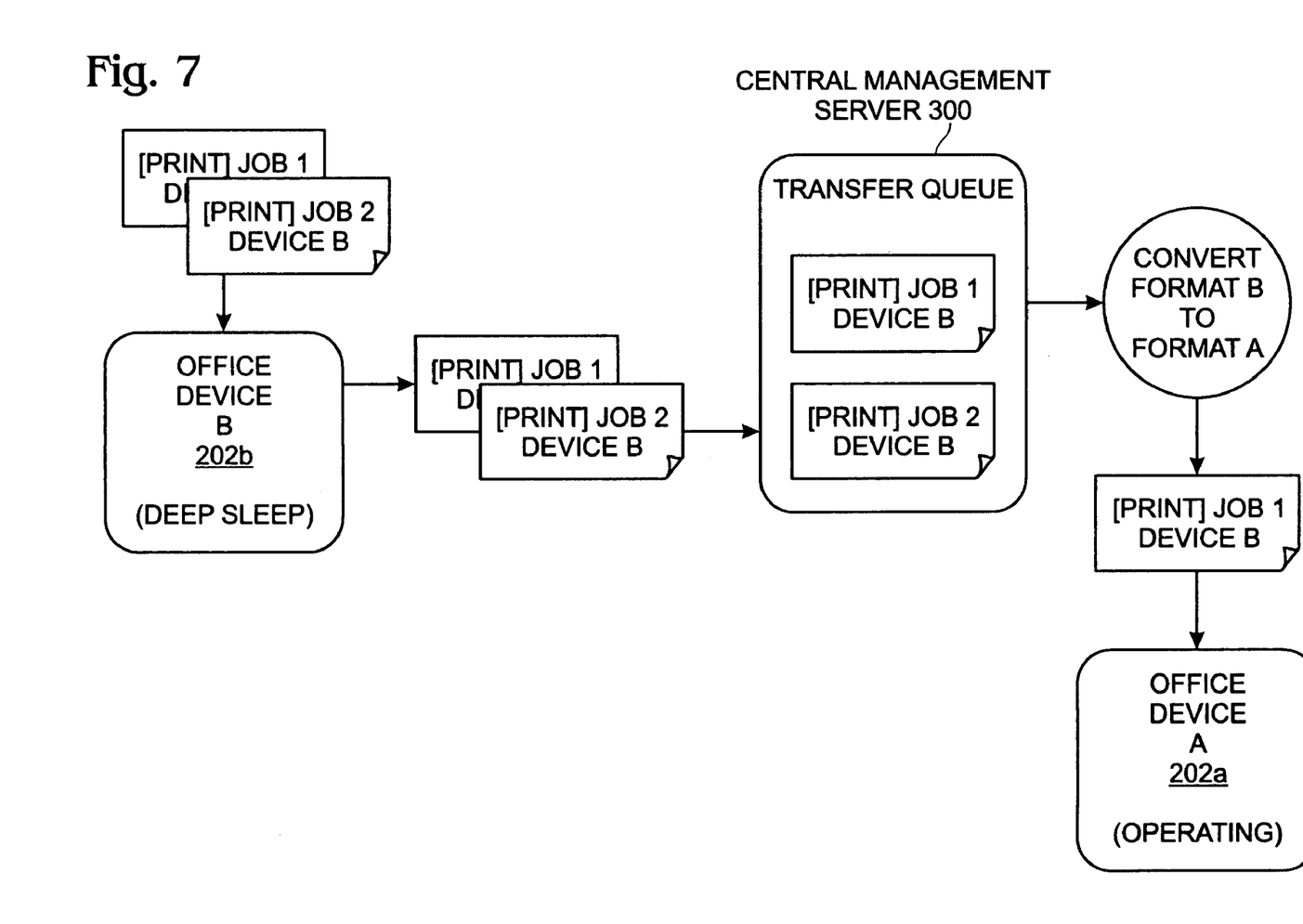
FIG. 7 is a diagram depicting the process of A->B conversion and the transfer of jobs from non-peak to peak devices.

FIG. 7 is a diagram depicting the process of A->B conversion and the transfer of jobs from non-peak to peak devices. In this aspect, the devices are depicted as printers or MFPs. When a job (e.g., print job) arrives at an off-peak power office device 202b during a peak power mode, the NIC card transfers the job data from the non-peak device to a peak power transfer queue enabled by the central management server 300. As part of the transfer, the off-peak power office device provides the transfer queue with information regarding the location of the peak power device to which the job is to be transferred. As is well known in the art, print jobs are transmitted to printing devices in a type of page description language (PDL) using conventions that permit the messages to be shorter than a corresponding file of pixel-by-pixel data. However, a number of languages exist, and language differentiation is often based upon the printer manufacturer.

Additionally, the off-peak power device may provide the transfer queue for device model information of its self and the peak power device. Alternately, the transfer queue may query the off-peak and peak power devices to obtain the device model information. In another aspect, the off-peak device simple transfers the job and either the central management server or power management module determines the transfer destination.

When the job is ready to be processed by the transfer queue, the job is removed from the queue and passed to a converter process, which can convert the format of the job from the first device (off-peak power device 202b) to the format of the second device (peak power device 202a). The converted job is then transferred to the peak power device for processing/outputting. The converter may be part of the transfer queue, central management server or module, another component with the internal network, or an external component, such as a conversion service provided as a cloud computing service.

Figure 8:
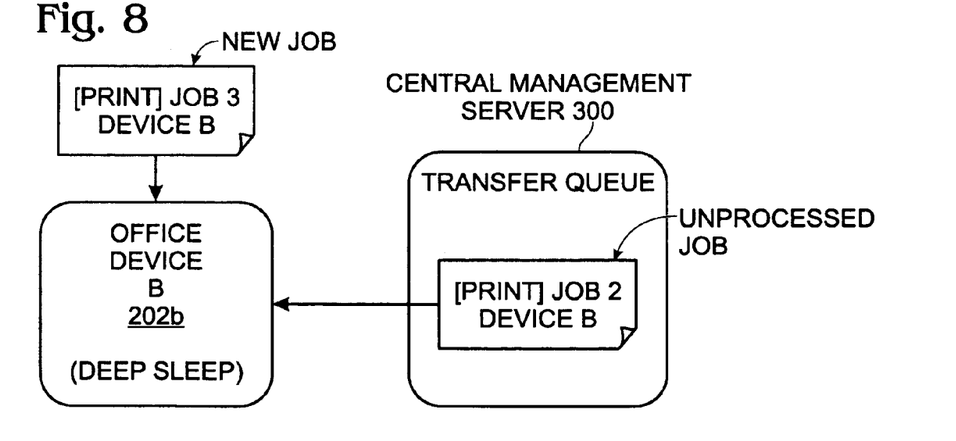
FIG. 8 is a diagram depicting elements of the system of FIG. 4, after the system returns to the non-peak power mode.

FIG. 8 is a diagram depicting elements of the system of FIG. 4, after the system returns to the non-peak power mode. A signal or administrative command is sent to the group(s) of office devices, which indicates the end of the peak power period and the beginning of a non-peak power period. In response to receiving the non-peak power mode command, there will be no change in the function of the peak power device. The peak power device continues to operate in full operational mode. The off-peak power device reverts back to the full operational mode. The disable/transfer message on LCD is extinguished and transfer function on the NIC card is suspended.

Additionally, if there are any unprocessed jobs remaining on the transfer queue that were originally intended for the off-peak device 202, these unprocessed job are transferred (in their original state) back to the originally intended device.

Figure 9:
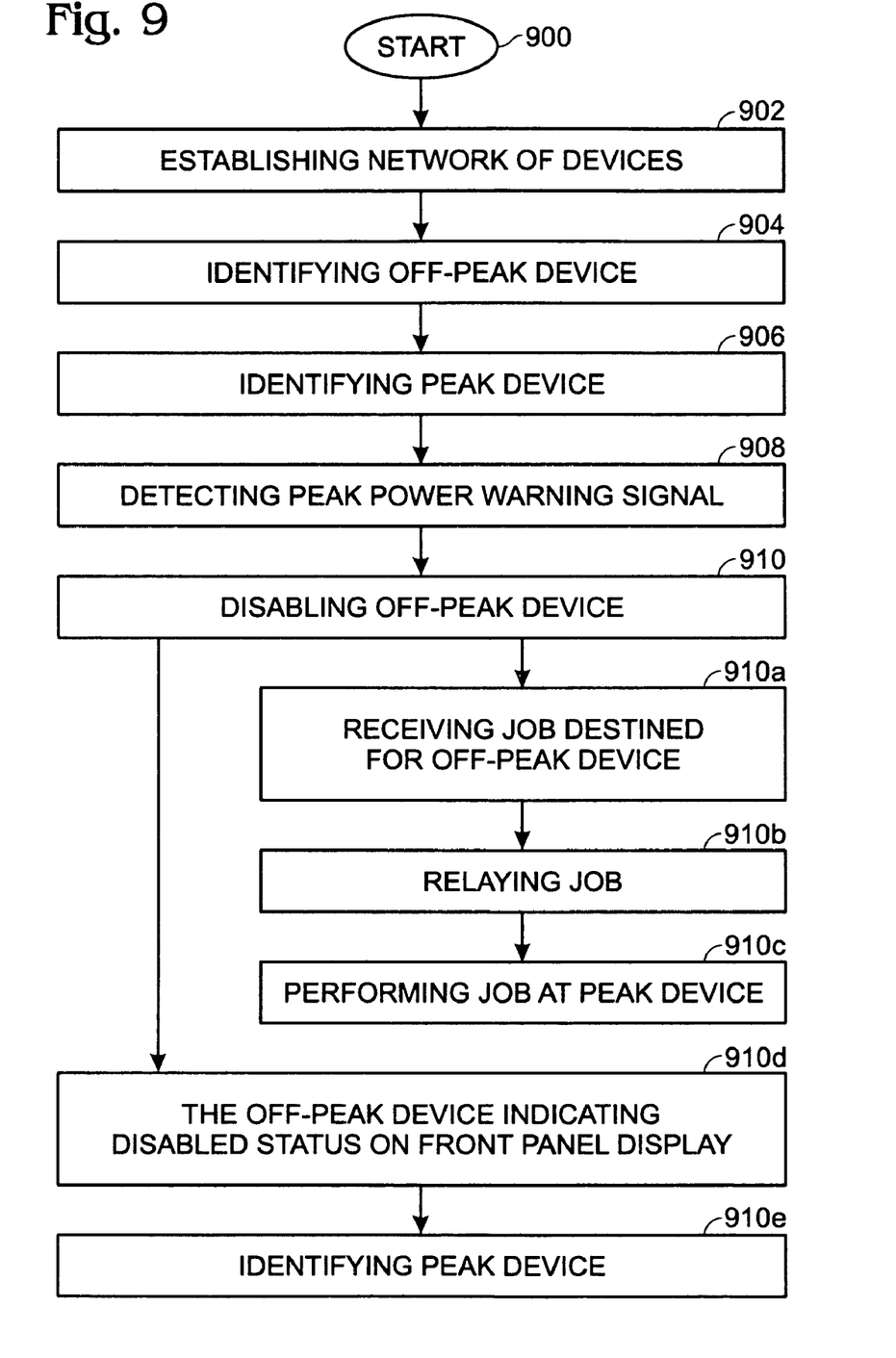
FIG. 9 is a flowchart illustrating a method for managing network-connected devices in peak power periods.

FIG. 9 is a flowchart illustrating a method for managing network-connected devices in peak power periods. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 900.

Step 902 establishes a network of connected devices. Step 904 identifies a first device in the network as an off-peak device, and Step 906 identifies a second device in the network as a peak device. For example, identifying the first device in the network as the off-peak device may be a result of comparing the power consumption of the first device to the second device, and selecting the first device as the device with the higher power consumption.

The network of connected devices may be comprised of printers, copiers. MFPs, electronic whiteboards, smartboards, teleconferencing equipment, air conditioners, heaters, lighting, and audio/visual equipment. However, the method is applicable to almost any type of electronic device. Step 908 detects an electromagnetic waveform representing a peak power warning signal. Step 910 disables the off-peak device in response to the peak power warning signal, but not the peak device. In one aspect. Step 910 includes substeps. Step 910a receives an electromagnetic waveform representing a job destined for the off-peak device from a source device. Step 910b relays the job to the peak device, and in Step 910c the peak device processes the job.

If Step 910a receives the job in a first job format associated with the off-peak device, then relaying the job to the peak device in Step 910b includes converting the job to a second job format associated with the peak device. In another aspect, disabling the off-peak device in response to the peak power warning signal in Step 910 includes sending an electromagnetic waveform to the source device representing a destination change message, indicating the location of the peak device processing the job.

In one aspect, detecting the peak power warning signal in Step 908 includes detecting a signal including rate information. Then, disabling the off-peak device in response to the peak power warning signal in Step 910 includes selecting off-peak devices in response to the rate information. As noted above, the determination of the off-peak device in Step 904 may depend upon rate information included with the peak warning signal.

In a different aspect, disabling the off-peak device in response to the peak power warning signal in Step 910 includes the use of a front panel display of the off-peak device and additional substeps. Step 910d indicates the disabled status of the off-peak device, and Step 910e indicates the identification of the peak device.

In one aspect, detecting the peak power warning signal in Step 908 includes each device in the network detecting the peak power warning signal (see FIG. 2). Alternately, establishing the network of connected devices in Step 902 includes establishing a network of devices connected through a central management device. The central management function may be enabled through the use of a central management module and central management server, see FIG. 3. Then, detecting the peak power warning signal in Step 908 includes the central management device detecting the peak power warning signal.

In this central management aspect, disabling the off-peak device in response to the peak power warning signal in Step 910 includes the central management device sending an electromagnetic waveform representing disable instructions to the off-peak device. Continuing this central management aspect, the central management device receives an electromagnetic waveform representing a job destined for the off-peak device from a source device in Step 910*a*. Note; the jobs may be sent directly to a central management device for assignment and distribution. Alternately, as shown in FIG. 7, jobs may be sent from an off-peak device to a central management device for distribution. The central management device relays the job to the peak device in Step 910*b*, and in Step 910*c* the peak device processes the job. If the central management device receives the job in a first job format associated with the off-peak device (Step 910*a*), in Step 910*b* it converts the job to a second job format associated with the peak device.

A system and method has been provided for managing network-connected devices in peak power periods. The use of MFP and printer devices has been presented to illustrate the invention. However, the invention is not limited to just these examples. Other variations and embodiments of the invention will occur to those skilled in the art.

I claim:

1. A method for managing network-connected devices in peak power periods, the method comprising: establishing a network of connected devices, each consuming power supplied by a power utility; identifying a first device in the network as an off-peak device; identifying a second device in the network as a peak device; detecting an electromagnetic waveform representing a peak power warning signal, where the peak power warning signal indicates a utility power rate increase; disabling the off-peak device in response to the peak power warning signal, but not the peak device; wherein disabling the off-peak device in response to the peak power warning signal, but not the peak device, includes: receiving an electromagnetic waveform representing a job destined for the off-peak device from a source device; relaying the job to the peak device; and, the peak device processing the job.

2. The method of claim 1 wherein receiving the job destined for the off-peak device includes receiving the job in a first job format associated with the off-peak device; and, wherein relaying the job to the peak device includes converting the job to a second job format associated with the peak device.

3. The method of claim 1 wherein disabling the off-peak device in response to the peak power warning signal, but not the peak device, further includes sending an electromagnetic waveform to the source device representing a destination change message, indicating the location of the peak device processing the job.

4. A system for managing network-connected devices in peak power periods, the system comprising: a plurality of devices each having a network-connected interface and an interface to accept power supplied by a power utility, the plurality of devices including a first device identified as an off-peak device and a second device identified as a peak device; a power management module having an interface to accept an electromagnetic waveform representing a peak power warning indicating a utility power rate increase, and to supply an electromagnetic waveform representing a disable signal to the off-peak device; wherein the off-peak device is disabled in response to the disable signal; wherein the off-peak device, subsequent to receiving the disable signal, receives an electromagnetic waveform representing a job from a source device, and relays the job to the peak device; and, wherein the peak device processes the job.

5. The system of claim 4 wherein the off-peak device sends an electromagnetic waveform to the source device representing a destination change message, indicating the location of the peak device processing the job.

6. The system of claim 4 wherein the power management module compares the power consumption of the devices in the network and supplies the disable signal to the device having the highest power consumption.

* * * * *